US006649716B2

(12) United States Patent
Andrekanic et al.

(10) Patent No.: US 6,649,716 B2
(45) Date of Patent: Nov. 18, 2003

(54) POLYMERIZATION OF ALPHA-METHYLSTYRENE

(75) Inventors: Ronald A. Andrekanic, White Oak, PA (US); Jeffrey S. Salek, Oakdale, PA (US); Steven E. Mulhall, Wooster, OH (US); Yuriy V. Bubnov, Pittsburgh, PA (US)

(73) Assignee: Sunoco, Inc. (R&M), Philadelphia, PA (US)

( * ) Notice: Subject to any disclaimer, the term of this patent is extended or adjusted under 35 U.S.C. 154(b) by 0 days.

(21) Appl. No.: 10/024,889

(22) Filed: Dec. 18, 2001

(65) Prior Publication Data

US 2003/0135000 A1 Jul. 17, 2003

(51) Int. Cl.$^7$ .......................... C08F 2/06; C08F 112/06
(52) U.S. Cl. ..................................... 526/221; 526/347.1
(58) Field of Search ................................. 526/221, 347, 526/347.1

(56) References Cited

U.S. PATENT DOCUMENTS

| | | | | | |
|---|---|---|---|---|---|
| 2,314,911 | A | * | 3/1943 | Trepp ..................... | 526/221 X |
| 3,657,369 | A | * | 4/1972 | Driscoll et al. .......... | 260/669 P |
| 3,753,961 | A | * | 8/1973 | St. Cyr .................... | 526/347 X |
| 3,956,250 | A | | 5/1976 | Campbell et al. | |
| 4,063,011 | A | | 12/1977 | Campbell et al. | |
| 4,614,768 | A | | 9/1986 | Lo | |
| 4,618,663 | A | | 10/1986 | Nakagawa | |
| 4,725,654 | A | | 2/1988 | Priddy et al. | |
| 4,732,936 | A | | 3/1988 | Holohan, Jr. | |
| 4,748,222 | A | | 5/1988 | Malanga | |
| 5,254,649 | A | * | 10/1993 | Miln et al. ................. | 526/221 |
| 5,391,670 | A | | 2/1995 | Biswas et al. | |
| 5,668,192 | A | | 9/1997 | Castellanos et al. | |
| 6,265,478 | B1 | * | 7/2001 | Kralevich, Jr. et al. ..... | 524/518 |

FOREIGN PATENT DOCUMENTS

WO          9637529          11/1996

OTHER PUBLICATIONS

Dainton and Tomlinson, "The Polymerization of α–Methylstyrene catalysed by Stannic Chloride in Ethyl Chloride Solution," J. Chem. Soc. (1953) 151–60.
Leonard J and Malhotra SL, *Ionic polymerization of p–Isopropyl–α–methylstyrne* J. Macromol. Sci.–Chem., A11(11), 1977, 2087–2112.
Takahashi T, Yokozawa T, and Endo T, *Cationic polymerization of γ–Methyl–and α–Methylphenylallene* Journal of Polymer Science: Part A: Polymer Chemistry, vol 30, 1992, 583–587.
Kwon Y, Cao X, and Faust R, *Investigation of new initiating systems for the living cationic polymerization of α–Methylstyrene* Polymer Science Program, Department of Chemistry University of Massachusetts Lowell 494–495.
Hotzel HE, Wondraczek RH, and Heublein G, *Studies on cationic copolymerization of α–Methylstyrene and indene 1. Basic kinetic investigations* Polymer Bulletin, vol 6, 1982, 521–527.
Li D, Hadjikyriacous S and Faust R, *Living carbocationic polymerization of α–Methylstyrene using tin halides as coinitiators* Macromolecules, vol 29, 1996, 6061–6067.
Matsuguma Y and Kunitake T, *The effect of conteranions on the polymer steric stucture in the cationic polymerization of α–Methylstyrene* Polymer Journal, vol 2., no 3, 1971, 353–358.
Cotrel R, Sauvet G, Vairon JP, and Sigwalt P, *Kinetic study of the cationic polymerization of p–methoxystyrene initiated by trityl hexachloroantimonate* Macromolecules, vol 9, no 6, Dec. 1976, 931–936.
Raimondi VV, *Polyalphamethylstyrene: Processing aid for thermoplastic polymers* Plastics Compounding Jan./Feb. 1980, 77–83.
Wilson AP and Raimondi VV, *Poly–alpha–methylstyrene as a process aid for rigid polyvinyl chloride* PVC Processing Can: 1978–598311, 5.1–5.12.
Wilson AP and Raimondi VV, *Poly(alpha–methylstyrene) as a processing aid for rigid poly(vinyl chloride)* Polymer Engineering and Science, vol 18, No. 11, 1978, 887–892.
Petkus SL, Raimondi VV, and Kutz NA, *Resin 18: Versatile modifier for the thermoplastic compounder* Chapter 51, 708–723.
Harmon KM et al, *Carbonium ion salts. XIII. Stable triarylcarbonium pentahalostannate (IV) salts* Inorg. Chem., vol 8, no 5, May 1969, 1054–1060.
Johnson AF and Pearce DA, *Trityl salt–initiated polymerization of styrene* J. Polymer Sci., Symposium No. 56, 1976 57–69.
Higashimura T, Fukushima T, and Okamura S, *Rate constant of initiation reaction in cationic polymerization of vinyl monomers. I. Polymerization of styrene derivatives catlyzed by triphenylmethyl stannic pentachloride* J. Macromol. Sci., A1(4), 1967, 683–697.

* cited by examiner

Primary Examiner—Fred Teskin
(74) Attorney, Agent, or Firm—Robert A. Koons, Jr.; Karen C. Richardson; Buchanan Ingersoll PC

(57) ABSTRACT

A process for producing polymers of α-methylstyrene uses tin IV chloride as a polymerization initiator. Use of tin IV chloride as an initiator allows polymerization to proceed without purification of the monomer prior to processing. Polymerization can be carried out at ambient temperatures with mild exotherms and good polymer yields. The process uses solvents commonly found in a plant producing α-methylstyrene.

9 Claims, No Drawings

POLYMERIZATION OF ALPHA-METHYLSTYRENE

FIELD OF THE INVENTION

The current invention relates to processes for the production of polymers. More particularly, the current invention relates to processes for the production of polymers of α-methylstyrene.

BACKGROUND OF THE INVENTION

Poly α-methylstyrene has many applications including, as processing aids and fusion enhancer/modifiers in applications such as vinyl flooring, as a processing aid in the extrusion and injection molding of PVC piping and profile extrusions such as vinyl siding and windows.

Traditional processes for the polymerization of α-methylstyrene to poly α-methylstyrene have made use of boron trifluoride or other protic acid catalyst/initiators, such as tetrafluorboric acid, hexafluorophosphoric acid and pentafluoroantimonate.

Other work has focused on the use of Lewis acids as coinitiators with cationic carbon species. This work includes: Li et al, "Living Carbocationic Polymerization of α-Methylstyrene Using Tin Halides as Coinitiators", *Macromolecules*, 1996, 29, 6061–6067; Cotrel et al, "Kinetic Study of the Cationic Polymerization of p-Methoxystyrene Initiated by Trityl Hexachloroantimonate", *Macromolecules*, November–December 1976, vol. 9, No. 6, 931–936; Hotzel et al, "Studies on Cationic Copolymerization of α-Methylstyrene and Indene", *Polymer Bulletin* 6, 521–527 1982; and Matsuguma et al, "The Effect of Counteranions on the Polymer Steric Structure in the Cationic Polymerization of α-Methylstyrene", *Polymer Journal*, vol. 2, No. 3, 353–358, 1971.

A drawback of most current art methods using cationic and Lewis acid initiators is that they require cold temperatures to control the polymerization and obtain polymers of the desired molecular weight and molecular weight distribution. Li et al report in "Living Carbocationic Polymerization of α-Methylstyrene Using Tin Halides as Coinitiators" that a rapid and uncontrolled polymerization may lead to side reactions and a broad molecular weight distribution.

A typical industrial process that was run by Amoco utilized boron trifluoride as an initiator to produce poly α-methylstyrene homopolymer. The process was run in a chlorohydrocarbon solvent at −25 to −80° C. In addition to the costs introduced by such extreme temperatures, the use of an environmentally unfavorable solvent such as chlorohydrocarbon, which is typical in similar processes, makes this an unattractive process.

Typical anionic catalyst/initiators are alkyl lithiums (U.S. Pat. Nos. 4,614,768, 4,725,654 and 4,748,222) and metal naphthalides, in "Ionic Polymerization of p-Isopropyl-α-Methylstyrene", *Journal of Macromolecular Sci.-Chem.*, A11(11), 2087–2112, 1977. Léonard et al.

A drawback of anionic initiators is that they are particularly sensitive to impurities. Unrefined α-methylstyrene, such as what may be obtained directly from an α-methylstyrene manufacturing facility, generally contains a number of trace oxygenated impurities, which adversely affect a number of commonly used polymerization initiators. These impurities include, but are not limited to 3-methyl-2-cyclopentanone (3-MCP), acetophenone, 2-methylbenzofuran (2-MBF) and acetone. In many cases, the presence of these trace impurities has the effect of inhibiting or killing an anionic polymerization initiator, with the result that little or no conversion of the monomer is obtained. As a result, it has been found to be necessary to pre-treat the monomer feed stream, such as with an acidic alumina or via distillation, to remove these trace impurities before proceeding to the polymerization step, adding time and costs to production. U.S. Pat. No. 4,614,768 to Lo, U.S. Pat. No. 4,725,654 to Priddy et al and U.S. Pat. No. 4,748,222 to Malanga disclose the necessity of purifying reactants in processes for polymerizing α-methylstyrene using an organolithium initiator.

Lack of viable alternatives for the production of poly α-methylstyrene homopolymer has led to a lapse in its production and the adoption of alternative co-polymers of α-methylstyrene, such as α-methylstyrene/styrene and α-methylstyrene/vinyltoluene.

Hence, it would be desirable to provide a process for producing polymers of α-methylstyrene that can be efficiently run and controlled at ambient temperatures, does not make use of environmentally unfavorable solvents and consistently produces a polymer of the desired molecular weight. It would further be desirable to provide a process for producing polymers of α-methylstyrene that does not require expensive and time-consuming pre-treatment of the monomer prior to polymerization. The advantages of such a process would include lower costs, a more robust reproducible process, increased efficiency and more controllable process temperature exotherms.

SUMMARY OF THE INVENTION

The current invention provides a process for the polymerization of α-methylstyrene that can manageably be carried out at ambient temperature. The current invention also provides a process for the polymerization of α-methylstyrene, which does not require extensive purification of the monomer prior to polymerization.

The invention achieves this through the use of tin IV chloride as an initiator for the polymerization of α-methylstyrene. According to one embodiment of the invention, α-methylstyrene monomer is provided as a solution in an organic solvent, preferably toluene or cumene. A small amount of tin IV chloride is then added to initiate polymerization of the α-methylstyrene. Preferably, the amount of tin IV chloride added is from about 0.10 to about 0.40% by weight based on the weight of α-methylstyrene in solution. The process is run at a temperature greater than about 0° C., preferably greater than about 10° C., and more preferably greater than about 20° C. The initiator may be added either neat or as a solution in a suitable solvent. Preferably, the initiator is added in a suitable solvent. The process may be run as a batch process or in continuous production.

According to one embodiment, the process may be run with α-methylstyrene and one or more co-monomers including, but not limited to propylene, ethylene, styrene, butadiene, acrylonitrile and methylmethacrylate to produce an α-methylstyrene co-polymer.

DETAILED DESCRIPTION

The process according to the current invention uses tin IV chloride as an initiator for the polymerization of α-methylstyrene to produce a poly α-methylstyrene polymer. It has been discovered that the use of tin IV chloride as an initiator for the polymerization of α-methylstyrene eliminates the need for tedious and expensive purification of the monomer prior to the polymerization. Additionally, it has been discovered that using tin IV chloride as an initiator, the polymerization can be initiated at ambient or higher temperatures without resulting in uncontrolled polymerization.

Examples 1 through 4 and the data in Tables I through IV demonstrate the superiority of the inventive process using tin IV chloride as a polymerization initiator.

EXAMPLE 1

A series of polymerizations were run using unpurified plant grade α-methylstyrene monomer and tin IV chloride as a polymerization initiator. Typical plant grade α-methylstyrene contains approximately 700 to 900 ppm of 3-MCP. All polymerizations were run using a 75% by weight solution of α-methylstyrene in toluene. The initiator was added at 0.20% by weight, based on the quantity of α-methylstyrene. The reaction time for each polymerization was three hours. Table I summarizes the data. All five reactions in Table I show a significant conversion the α-methylstyrene monomer to polymer.

hexane. The TFABA was added at 0.00156 to 0.0156% by weight based on α-methylstyrene. The reaction time allowed in each comparative example was 60 minutes. Table III summarizes the data. All seven reactions in Table III show zero conversion of the α-methylstyrene monomer to polymer.

TABLE III

| Reaction | Initial Temperature ° C. | Peak Exotherm Temperature ° C. | % Monomer Conversion Based on recovered yield |
|---|---|---|---|
| 12 | −8.5 | −8.5 | 0 |
| 13 | −8.5 | −8.5 | 0 |
| 14 | −8.5 | −8.5 | 0 |
| 15 | −8.5 | −8.5 | 0 |
| 16 | −8.5 | −8.5 | 0 |
| 17 | −8.5 | −8.5 | 0 |
| 18 | −8.5 | −8.5 | 0 |

TABLE I

| Reaction | Concentration of AMS weight % | Initial Temperature ° C. | Peak Exotherm Temperature ° C. | Percent Polymer | Percent Oligomer | Percent Monomer | % Monomer Conversion Based on recovered yield |
|---|---|---|---|---|---|---|---|
| 1 | 75 | 30 | 31 | 87.5 | 10.7 | 1.8 | 32 |
| 2 | 75 | 20 | 21.5 | 88.8 | 7.8 | 3.35 | 67 |
| 3 | 75 | 20 | 29 | 63 | 36.5 | 0.84 | 80 |
| 4 | 75 | 20 | 30.2 | 59.2 | 40 | 0.25 | 80 |
| 5 | 75 | 10 | 13.4 | 85 | 11.7 | 3.29 | 78 |

EXAMPLE 2

A series of polymerizations were run using unpurified plant grade α-methylstyrene monomer and tin IV chloride as a polymerization initiator as in Example 1, except that the solvent used is cumene. Table II summarizes the data. All seven reactions in Table II show a significant conversion of the α-methylstyrene monomer to polymer.

EXAMPLE 4

A final series of comparative example polymerizations were run with α-methylstyrene monomer that was purified by pre-treatment with acidic alumina. Pre-treatment with acidic alumina decreases the 3-MCP content to approxi-

TABLE II

| Reaction | Concentration of AMS weight % | Initial Temperature ° C. | Peak Exotherm Temperature ° C. | Percent Polymer | Percent Oligomer | Percent Monmomer | % Monomer Conversion Based on recovered yield |
|---|---|---|---|---|---|---|---|
| 6 | 75 | 35 | 35 | 86.6 | 12.2 | 0.55 | 59.8 |
| 7 | 75 | 30 | 30.2 | 60 | 39.3 | 0.7 | 80 |
| 8 | 75 | 25 | 32 | 94.2 | 2.9 | 2.3 | 79 |
| 9 | 75 | 25 | 27 | 72 | 27.1 | 1.61 | 96 |
| 10 | 75 | 20 | 29 | 71.5 | 25.3 | 3.2 | 89 |
| 11 | 75 | 15 | 26 | 53 | 41.5 | 5.5 | 81 |

EXAMPLE 3

A series of comparative example polymerizations were run using unpurified plant grade α-methylstyrene monomer, as in examples 1 and 2, except that trityl tetrakis (pentafluorophenyl) borate, TFABA, was used as the polymerization initiator. All of the comparative examples here used a 25% by weight solution of α-methylstyrene in mately 5 ppm. All of the comparative examples here used either a 20 or 43.3% by weight solution of α-methylstyrene in toluene. The TFABA was added at 0.0039% by weight based on α-methylstyrene. Table IV summarizes the data. All six reactions in Table IV show almost complete conversion of the α-methylstyrene monomer.

TABLE IV

| Reaction | Concentration of AMS weight % | Initial Temperature ° C. | Peak Exotherm Temperature ° C. | Percent Polymer | Percent Oligomer | Percent Monmomer | % Monomer Conversion Based on recovered yield |
|---|---|---|---|---|---|---|---|
| 19 | 43.3 | 25 | 103.5 | 20 | 80 | 0 | 100 |
| 20 | 43.3 | 10 | 85.9 | 30 | 68.5 | 1.5 | 98.5 |
| 21 | 43.3 | 0 | 63.3 | 40 | 54 | 6 | 94 |
| 22 | 20 | 20 | 48.3 | 9 | 89 | 1 | 99 |
| 23 | 20 | 10 | 39.2 | 20 | 79.6 | 0.4 | 99.6 |
| 24 | 20 | 0 | 18.6 | 50 | 49.8 | 0.2 | 99.8 |

Comparative Examples 3 and 4 demonstrate the deleterious effects of 3-MCP and other oxygenated impurities on TFABA as a polymerization initiator for the polymerization of α-methylstyrene. Additional trials run using trityl-pentachlorostannate, t-SnCl$_5$, demonstrated a similar effect of these impurities in retarding polymerization of α-methylstyrene. Conversely, Examples 1 and 2 demonstrate that efficient conversion of α-methylstyrene monomer to poly α-methylstyrene can be obtained even without pre-treatment of the monomer feed stream to remove 3-MCP and other oxygenated impurities. Additionally, it can be seen by comparing the data in Tables I and II with Table IV, that using tin IV chloride as the polymerization initiator results in a much milder exotherm and a higher proportion of polymer relative to oligomer than TFABA, even using much more concentrated solutions of α-methylstyrene or in neat monomer. This indicates that the polymerization is much more controlled than with TFABA.

The process of the current invention offers clear advantages over current art methods in that it does not require the use of extreme sub-zero temperatures and avoids the use of environmentally unfavorable solvents. The process is run efficiently at ambient temperature in solvents commonly available in facilities producing AMS monomer or even neat. Further, the process is capable of being run at high weight concentrations of the AMS monomer with an economical amount of initiator. Further, the polymerization can be controlled to minimize reaction exotherm, reducing costs, production time and simplifying product handling. Further, the use of tin IV chloride yields a significant amount of polymer relative to TFABA and other cationic initiators.

Additionally, the process may be run with α-methylstyrene and one or more co-monomers including, but not limited to; propylene, ethylene, styrene, butadiene, acrylonitrile and methylmethacrylate to produce an α-methylstyrene co-polymer.

The solvents and concentrations demonstrated in the examples are however, not to be considered limiting of the process. Those skilled in the art will recognize that the actual reaction conditions used may be adjusted to fit the manufacturing scale and equipment desired. All of these variations are considered to be within the scope of the present invention.

What is claimed is:

1. A process for producing a homopolymer of α-methylstyrene, the process comprising:
   providing a reaction solution consisting essentially of α-methylstyrene monomer and a solvent at a temperature above about 0° C., and adding to said solution an initiator comprising tin IV chloride.

2. A process according to claim 1, wherein the temperature is above about 10° C.

3. A process according to claim 1, wherein the temperature is above about 20° C.

4. A process according to claim 1, wherein said solvent is selected from the group consisting of toluene, cumene and hexane.

5. A process according to claim 1, wherein said initiator is added in a quantity from about 0.10% to about 0.40% by weight relative to α-methylstyrene.

6. A process according to claim 1, wherein said initiator is added as a solution.

7. A process according to claim 1, wherein said process is run continuously.

8. A process for producing a homopolymer of α-methylstyrene, the process comprising:
   providing a reaction solution consisting essentially of α-methylstyrene monomer and a solvent at a temperature above about 10° C., and adding to said solution a initiator comprising tin IV chloride, said initiator being added in a quantity from about 0.10% to about 0.40% by weight relative to α-methylstyrene.

9. A process according to claim 8, wherein said solvent is selected from the group consisting of toluene, cumene and hexane.

* * * * *